US012728346B2

(12) United States Patent
Yurgulski

(10) Patent No.: US 12,728,346 B2
(45) Date of Patent: Sep. 8, 2026

(54) GAME JOYSTICK

(71) Applicant: HUIZHOU VKB TECHNOLOGY CO., LTD, Huizhou (CN)

(72) Inventor: Ilya Yurgulski, Huizhou (CN)

(73) Assignee: HUIZHOU VKB TECHNOLOGY CO.,LTD, Huizhou (CN)

( * ) Notice: Subject to any disclaimer, the term of this patent is extended or adjusted under 35 U.S.C. 154(b) by 156 days.

(21) Appl. No.: 18/885,782

(22) Filed: Sep. 16, 2024

(65) Prior Publication Data

US 2025/0001289 A1 Jan. 2, 2025

(30) Foreign Application Priority Data

Jul. 11, 2024 (CN) ........................ 202410929939.X

(51) Int. Cl.
*A63F 13/245* (2014.01)
*A63F 13/803* (2014.01)

(52) U.S. Cl.
CPC .......... *A63F 13/245* (2014.09); *A63F 13/803* (2014.09)

(58) Field of Classification Search
CPC ...... A63F 13/245; A63F 13/803; A63F 13/24; A63F 13/92; A63F 2300/1043
USPC ........................................................... 463/38
See application file for complete search history.

(56) References Cited

U.S. PATENT DOCUMENTS 5,591,082 A * 1/1997 Jensen ..................... G05G 1/04 434/45
8,696,460 B2 * 4/2014 Odinot ..................... G05G 1/04 446/139
11,330,908 B1 * 5/2022 Strosin ................... A47C 7/705
11,426,651 B1 * 8/2022 Jensen .................. A63F 13/245
2002/0091003 A1 * 7/2002 Beken ..................... A63F 13/30 472/60
2009/0149256 A1 6/2009 Lui
2010/0255915 A1 * 10/2010 Spradley .................. G09B 9/08 463/38
2015/0314193 A1 11/2015 Lee et al.
2016/0030837 A1 2/2016 Lin et al.
2018/0120888 A1 * 5/2018 Meuzelaar .......... A63F 13/2145
2020/0254334 A1 * 8/2020 Soelberg ................. A63F 13/22

* cited by examiner

*Primary Examiner* — Michael A Cuff
(74) *Attorney, Agent, or Firm* — Hemisphere Law, PLLC

(57) ABSTRACT

The present disclosure discloses a game joystick, including a control grip, a gimbal, and a throttle base; a throttle assembly is arranged in the throttle base; an upper end of the gimbal is connected to the control grip; a lower end of the gimbal is connected to the throttle assembly; the control grip is pushed with a hand forwards, backwards, leftwards, or rightwards, so that the control grip can tilts forwards, backwards, leftwards, and rightwards relative to the throttle base. According to the present disclosure, through the gimbal arranged in the control grip, a spacecraft in a game can be controlled to do micro and precise motions upwards, downwards, leftwards, and rightwards with the hand and the forearm without changing throttle control position.

10 Claims, 8 Drawing Sheets

GAME JOYSTICK

TECHNICAL FIELD

The present disclosure relates to the technical field of game peripherals, and in particular, to a game joystick.

BACKGROUND

Unlike fixed wing aircrafts in air, spacecrafts in space have the following axes of motion: forward and backward (axis 1), pitch (axis 2), roll (axis 3), yaw (axis 4), up and down (axis 5), and left and right (axis 6). In a game environment, piloting a spacecraft is accomplished using two external devices, independently operated by two hands. There are three main control schemes: HOSAS (two joysticks), omnidirectional throttle, and HOTAS (a joystick and a throttle).

In the HOSAS scheme, each hand operates one joystick. This scheme is very inconvenient because one axis on the left joystick does not correspond to an actual direction of motion of the spacecraft, which does not conform to an ergonomic control mechanism.

The omnidirectional throttle scheme (in which, two joysticks are used: the left joystick using a special adapter forms at a certain angle relative to a base) is more advantageous than the HOSAS scheme because all the axes intuitively correspond to the direction of motion of the spacecraft. However, the control precision along axis 5 and axis 6 is still unsatisfactory. This is because the motions of these axes are controlled by the arms and shoulders. The omnidirectional throttle scheme is more suitable for substantial and intense motions, rather than fine manipulation.

In the HOTAS scheme, the right-hand joystick controls axis 2—pitch, axis 3—roll, and axis 4—yaw, and the left-hand integrated throttle device controls axis 1—forward and backward, axis 5—up and down, and axis 6—left and right. Forward and backward axes are controlled by a throttle lever, operated by the shoulders of the arms, and up and down axes (without changing pitch) and left and right axes (without changing yaw) are operated by one finger (usually the index finger) of the left hand. In this case, the necessary control precision and accuracy can only be achieved along axis 1 (forward and backward, as this is a long travel axis, the precision can be achieved using the muscles of the shoulder and arm). However, due to a small linear motion range of a control device (in terms of ergonomics) and the inability of a human hand to perform small and precise motions quickly and simultaneously with one finger (in terms of anatomy), it is fundamentally impossible to achieve the desired control precision and accuracy along axis 5 and axis 6.

Therefore, a game joystick is proposed.

SUMMARY

The present disclosure aims to provide a game joystick, thereby solving or at least relieving one or more of the above problems in the prior art and problems of other aspects.

To achieve the above objectives, main technical solutions used by the present disclosure are as follows:

A game joystick includes a control grip, a gimbal, and a throttle base; a throttle assembly is arranged in the throttle base; an upper end of the gimbal is connected to the control grip; a lower end of the gimbal is connected to the throttle assembly; the control grip is pushed with a hand forwards, backwards, leftwards, or rightwards, so that the control grip tilts forwards, backwards, leftwards, and rightwards relative to the throttle base, and a spacecraft in a game moves upwards, downwards, leftwards, or rightwards; after the pressure on the control grip is relieved, the control grip can achieve automatic returning; the control grip is overall pushed forwards or pulled backwards with an arm; and the control grip drives the throttle assembly to achieve throttling up or throttling down, thereby achieving a throttle-up or throttle-down operation on the spacecraft in the game.

According to the game joystick of the present disclosure, the control grip includes an upper grip shell; a circuit board is mounted on the upper grip shell; and a lower grip shell configured to protect the circuit board is mounted at a bottom of the upper grip shell.

According to the game joystick of the present disclosure, the gimbal includes a universal joint and a grip connecting rod; the universal joint includes a universal joint main body; the universal joint main body is mounted on the upper grip shell through a front-back returning mechanism; an upper end of the grip connecting rod is mounted on the universal joint main body through a left-right returning mechanism; when the grip connecting rod is connected to the throttle base, the grip connecting rod remains stationary; the universal joint main body and the control grip rotate leftwards or rightwards relative to the grip connecting rod; when the grip connecting rod is connected to the throttle base, the universal joint main body and the grip connecting rod remain stationary, and the control grip rotates forwards or backwards relative to the universal joint main body; a side panel is mounted between the upper grip shell and the lower grip shell; a plurality of different types of controls are installed on the side panel; and the controls include a button, a 5-way hat switch, an encoder wheel, and a thumbwheel wheel.

According to the game joystick of the present disclosure, the front-back returning mechanism includes a first trunnion seat and two first returning clamps; the universal joint main body is U-shaped; the first trunnion seat is fixedly mounted on the upper grip shell; a first damping shaft is formed on one side of the universal joint main body; the first damping shaft is rotatably mounted on the first trunnion seat through a first bearing; a first damping clip configured to adjust the damping during the rotation of the universal joint main body is mounted on the first trunnion seat; one end of the first damping clip is fixedly mounted at one end of the first trunnion seat, and a trunnion seat sleeve is formed at the other end of the first trunnion seat; a first insert nut is arranged in the other end of the first damping clip; a first spring is arranged in the trunnion seat sleeve; a first damping adjustment screw is in threaded connection with the first insert nut after passing through the trunnion seat sleeve; a lower end of the first spring presses a top of the first damping clip; a top of the first spring resists against an upper end inside the trunnion seat sleeve; a first flexible damping liner is arranged at an upper part of the first damping clip; the first flexible damping liner is pressed on a surface of the first damping shaft by the first damping clip;

The two first returning clamps are arranged in a mirror image manner; first clamping blocks are arranged at tops of the two first returning clamps; a first stop block is formed on the first trunnion seat; the two first returning clamps rotatably sleeve the first damping shaft; the first clamping block at the top of one of the first returning clamps resists against one side of the first stop block, and the first clamping block at the top of the other first returning clamp resists against the other side of the first stop block; tail ends of the two first returning clamps are connected through a first tension spring; a first pull block is formed at a lower end of one side of the universal joint main body close to the first damping shaft; and the first pull block is arranged between the tail ends of the two first returning clamps.

According to the game joystick of the present disclosure, a front-back sensing shaft is formed on the other side of the universal joint main body away from the first damping shaft; a first magnet mounting hole is formed in an end portion of the front-back sensing shaft; a first magnet is fixedly connected into the first magnet mounting hole; the upper grip shell is fixedly connected with a front-back trunnion seat; the front-back sensing shaft is rotatably mounted on the front-back trunnion seat through a front-back bearing; a first magnetic induction chip is mounted on the front-back trunnion seat; the first magnetic induction chip is configured to detect a change value of a magnetic field caused by rotation of the first magnet; and the first magnetic induction chip is electrically connected to the circuit board.

According to the game joystick of the present disclosure, the left-right returning mechanism includes a second trunnion seat and a second returning clamp; the second trunnion seat is fixedly mounted on the universal joint main body; a second damping shaft is formed at an upper end of one side of the grip connecting rod; a through hole is provided at a bottom of the universal joint main body; a second stop block is arranged on an inner wall of the through hole; the first damping shaft is perpendicular to the second damping shaft; the second damping shaft is rotatably mounted on the second trunnion seat through a second bearing; the universal joint main body is provided with a second damping clip configured to adjust the damping during the rotation of the grip connecting rod; one end of the second damping clip is fixedly mounted at one end of the universal joint main body; a mounting sleeve is formed at the other end of the universal joint main body; a second insert nut is arranged inside the other end of the first damping clip; a second spring is arranged in the mounting sleeve; a second damping adjustment screw is in threaded connection with the second insert nut after passing through the mounting sleeve; a lower end of the second spring presses a top of the second damping clip; a top of the second spring resists against an upper end inside the mounting sleeve; a second flexible damping liner is arranged at an upper part of the second damping clip; the second flexible damping liner is pressed on a surface of the second damping shaft by the second damping clip;

The two second returning clamps are arranged in a mirror image manner; second clamping blocks are arranged at tops of the two second returning clamps; the two second returning clamps rotatably sleeve the second damping shaft; the second clamping block at the top of one of the second returning clamps resists against one side of the second stop block, and the second clamping block at the top of the other second returning clamp resists against the other side of the second stop block; tail ends of the two second returning clamps are connected through a second tension spring; a second pull block is formed at an upper end of the grip connecting rod close to the second damping shaft; and the second pull block is arranged between the tail ends of the two second returning clamps.

According to the game joystick of the present disclosure, a left-right sensing shaft is formed on the other side of the grip connecting rod away from the second damping shaft; a second magnet mounting hole is formed in an end portion of the left-right sensing shaft; a second magnet is fixedly connected into the second magnet mounting hole; the universal joint main body is fixedly connected with a left-right trunnion seat; the left-right sensing shaft is rotatably mounted on the left-right trunnion seat through a left-right bearing; a second magnetic induction chip is mounted on the left-right trunnion seat; the second magnetic induction chip is configured to detect a change value of a magnetic field caused by rotation of the second magnet; and the second magnetic induction chip is electrically connected to the circuit board.

According to the game joystick of the present disclosure, the throttle base includes a base housing and a bottom plate; the base housing is fixedly mounted on the bottom plate; the throttle mechanism includes two throttle connecting rods and a grip adapter; two sides of lower ends of the two throttle connecting rods are rotatably provided with throttle trunnion seats through throttle bearings; the throttle trunnion seats are fixedly mounted on the base housing; a quick-release detent frame is fixedly mounted at a top of the base housing through a bolt; upper ends of the two throttle connecting rods are clamped to a lower end of the grip adapter after sliding through the top of the base housing; a lower end of the grip connecting rod is fixedly connected to the grip adapter; a top of the grip adapter is clamped with a cover plate; a detent roller is fixedly connected between the two throttle connecting rods; and the detent roller is in contact with a top of the quick-release detent frame.

According to the game joystick of the present disclosure, a damping adjustment member is arranged in the base housing; the damping adjustment member includes a throttle damping clip; one end of the throttle damping clip is fixedly connected to an inner top of the base housing, and the other end of the throttle damping clip is provided with a third insert nut at an inner bottom; a lower end of a hand screw is in threaded connection with the third insert nut after penetrating through the top of the base housing; a third spring sleeves the hand screw; a top of the third spring resists against the inner top of the base housing; a bottom of the third spring resists against a top of the throttle damping clip; a flexible throttle damping liner is arranged on an inner side of the throttle damping clip; the flexible throttle damping liner is pressed at bottoms of the throttle connecting rods by the throttle damping clip; and a screw limiting plate configured to limit the third insert nut is fixedly connected to a bottom of the throttle damping clip.

According to the game joystick of the present disclosure, a groove is formed on a top of the upper grip shell; an adjustment hole is formed inside the groove; a fixing hole configured to fix an adjustment hole cover in the groove is formed in the groove; and the top of the upper grip shell is fixedly bonded with a first antislip pad and a second antislip pad.

The present disclosure at least has the following beneficial effects:

According to the present disclosure, through the gimbal arranged in the control grip, a spacecraft in a game can be controlled to do micro and precise motions upwards, downwards, leftwards, and rightwards with the hand and the forearm without changing throttle control position. Since the throttle control is achieved by moving the whole joystick and is not related to a position of the control grip relative to the gimbal, the throttle control is decided by the grip connecting rod driving the throttle connecting rods for long-stroke rotation. This action is achieved by pushing, by a shoulder muscle, the control grip and the gimbal to move forwards or backwards. At this time, the control grip and the gimbal form a whole.

Through the damping-adjustable structures arranged in the gimbal and the throttle mechanism, the whole game joystick can adjust the corresponding damping according to a use habit of a user.

Through the left-right returning mechanism and the front-back returning mechanism which are arranged in the gimbal, after the force applied to the control grip is relieved, the control grip can achieve automatic returning relative to the gimbal, so that the whole joystick is very convenient to operate.

BRIEF DESCRIPTION OF THE DRAWINGS

The accompanying drawings described here are used to provide a further understanding of the present disclosure and form a part of the present application. The illustrative embodiments and their explanations of the present disclosure are used to explain the present disclosure and do not constitute an improper limitation on the present disclosure. In the accompanying drawings.

Figure 1:
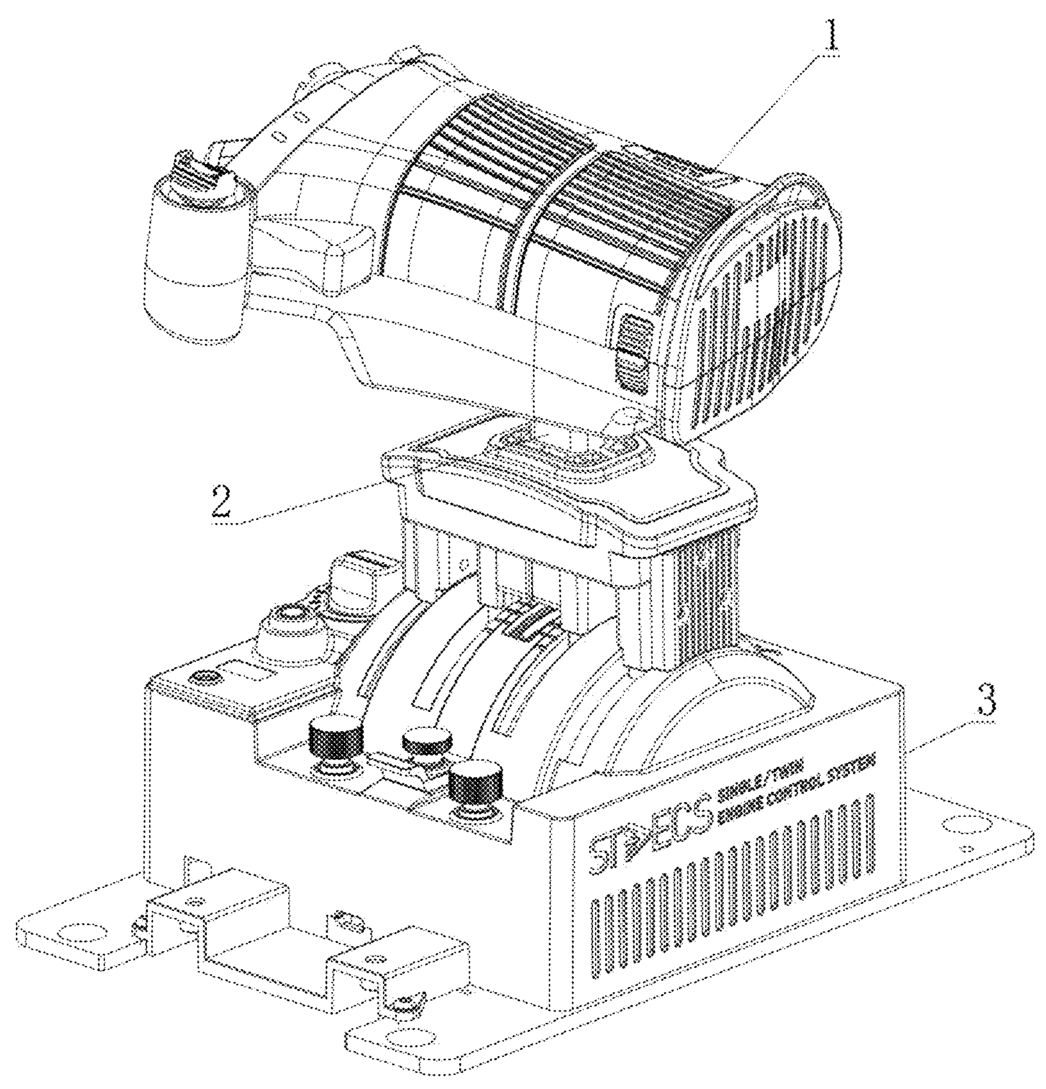
FIG. 1 is a schematic structural diagram of a game joystick according to the present disclosure.

Reference numerals in the accompanying drawings:

1: control grip; 101: upper grip shell; 102: lower grip shell; 1021: first antislip pad; 1022: second antislip pad; 1023: adjustment hole cover; 1024: groove; 1025: fixing hole; 1026: adjustment hole; 103: circuit board; 1031: grip side panel;

2: gimbal;

201: universal joint main body; 2011: first damping shaft; 20111: first trunnion seat; 201111: first stop block; 20112: first flexible damping liner; 20113: first damping clip; 20114: first returning clamp; 20115: first tension spring; 20116: first spring; 20117: first bearing; 20118: first damping adjustment screw;

2012: first pull block;

2013: front-back sensing shaft; 20131: first magnet; 20132: front-back bearing; 20133: front-back trunnion seat; 20134: first magnetic induction chip;

2014: second stop block; 2015: mounting sleeve;

202: grip connecting rod; 2021: second damping shaft; 20211: second trunnion seat; 20212: second flexible damping liner; 20213: second damping clip; 20214: second returning clamp; 20215: second tension spring; 20216: second spring; 20217: second bearing; 20218: second damping adjustment screw;

2022: second pull block;

2023: left-right sensing shaft; 20231: second magnet; 20232: left-right bearing; 20233: left-right trunnion seat; 20234: second magnetic induction chip;

3: throttle base; 301: base housing; 3011: bottom plate; 302: quick-release detent frame; 303: grip connecting rod; 304: cover plate; 305: detent roller; 306: throttle connecting rod; 307: throttle trunnion seat; 308: throttle bearing; 309: throttle damping clip; 310: flexible throttle damping liner; 311: hand screw; 312: third spring; 313: screw limiting sheet; and 314: third insert nut.

DETAILED DESCRIPTION OF THE EMBODIMENTS

The implementations of the present disclosure will be explained in detail below in conjunction with the accompanying drawings and embodiments, so that an implementation process of how to solve the technical problems using the technical means and achieve the technical effects in the present disclosure can be fully understood and implemented.

Figure 2:
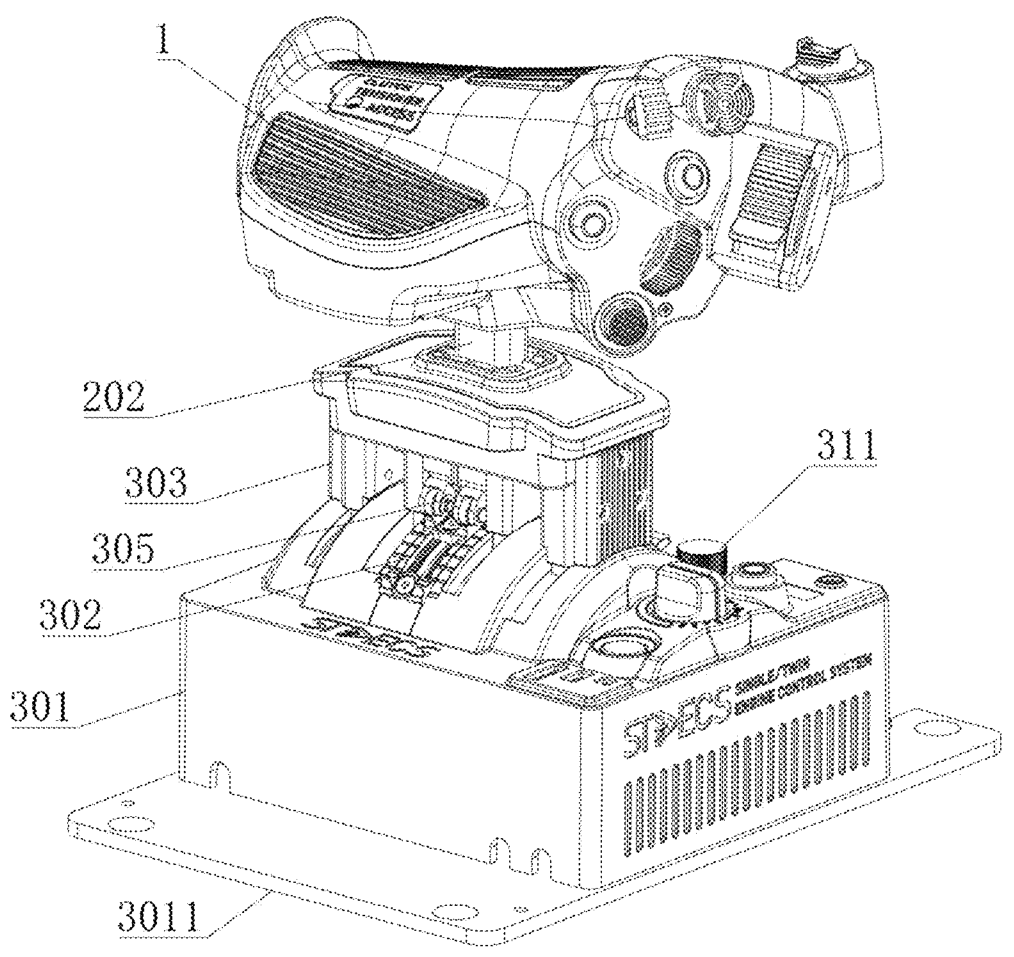
FIG. 2 is a schematic structural diagram in another viewing angle of the present disclosure.
Figure 3:
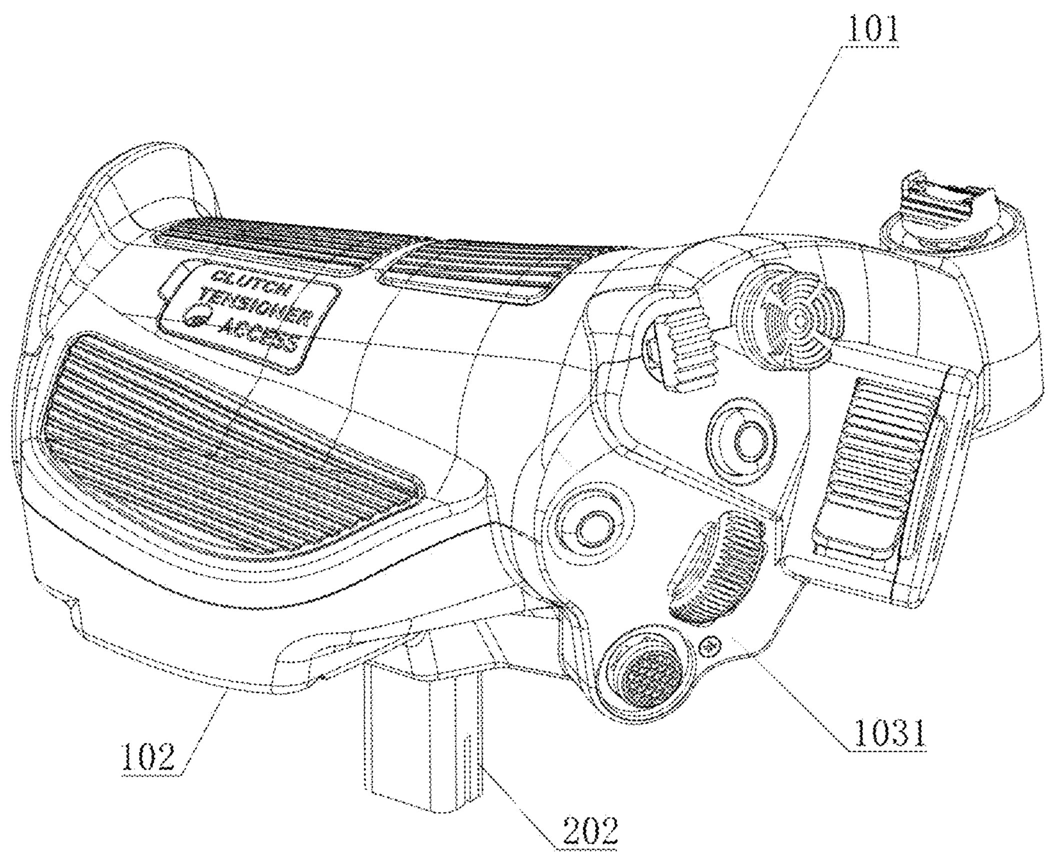
FIG. 3 is a partially structural diagram I of the present disclosure.
Figure 4:
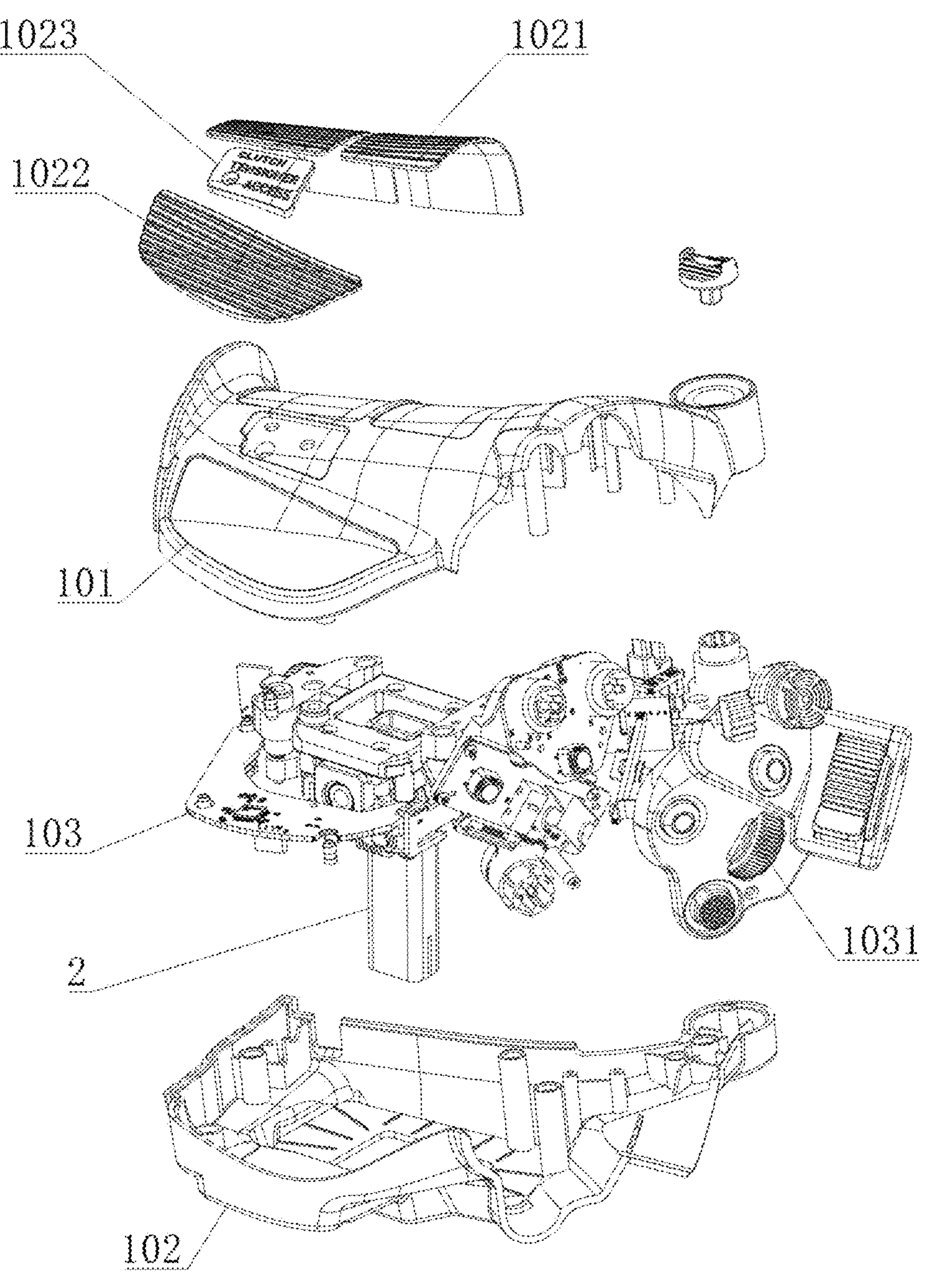
FIG. 4 is a schematic diagram of an exploded structure of a control grip according to the present disclosure.
Figure 5:
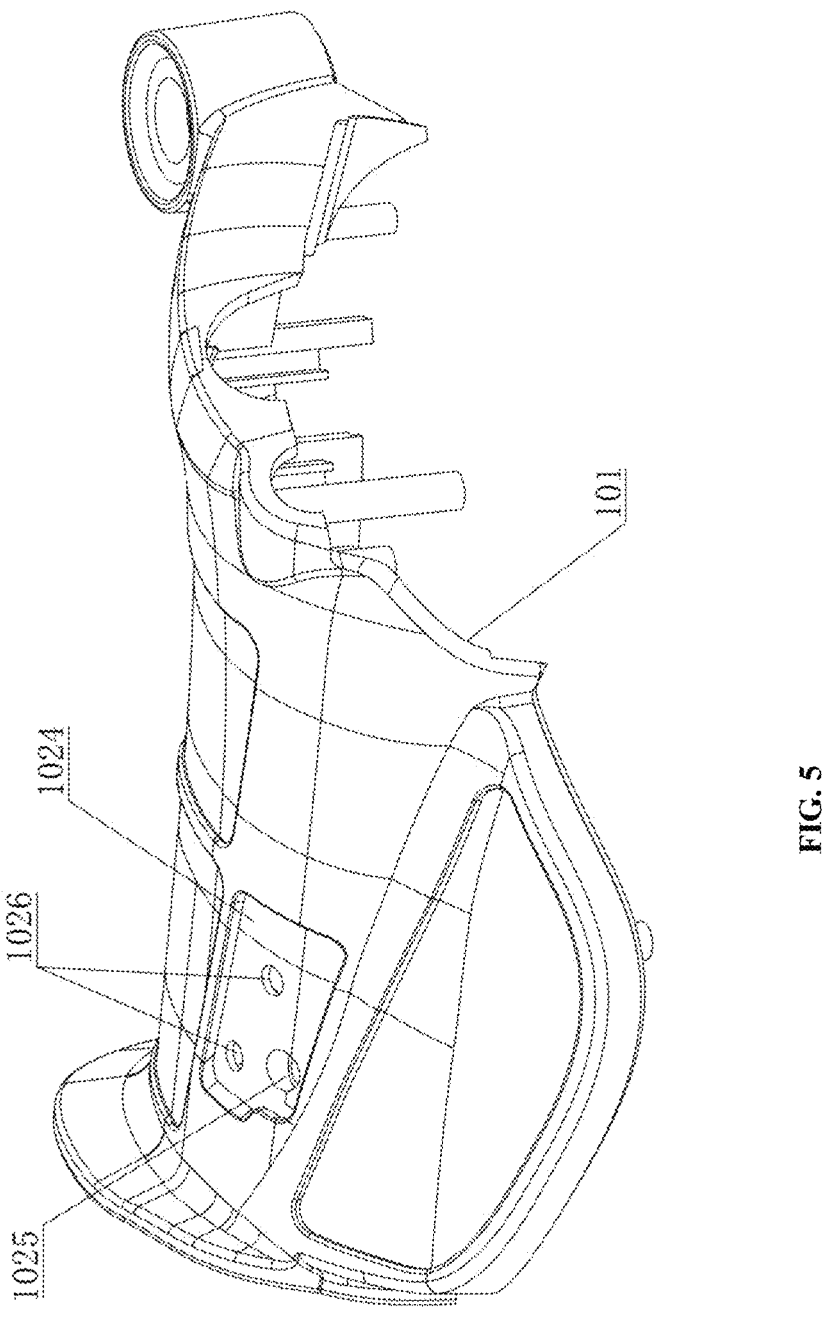
FIG. 5 is a schematic structural diagram of an upper grip shell according to the present disclosure.
Figure 6:
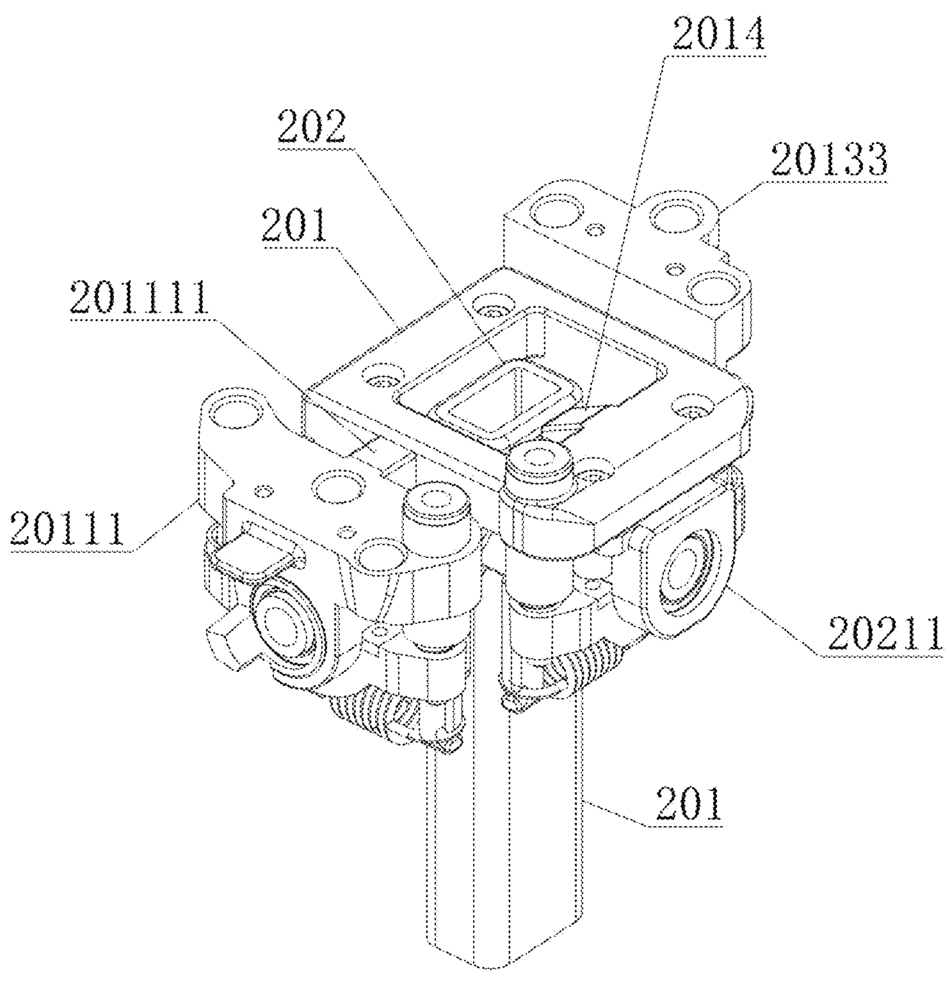
FIG. 6 is a schematic diagram of an exploded structure of a gimbal according to the present disclosure.
Figure 7:
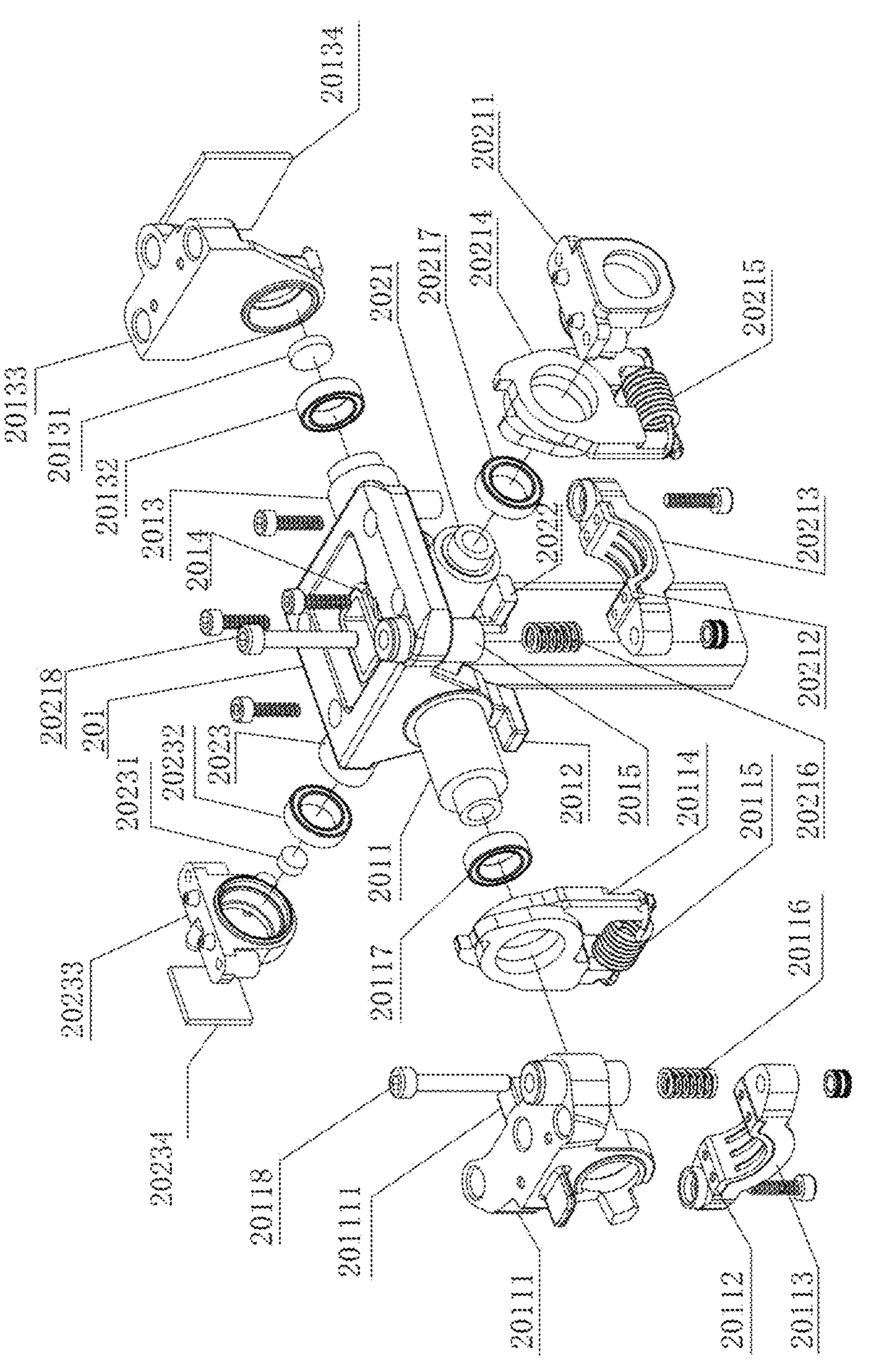
FIG. 7 is a schematic structural diagram of a gimbal according to the present disclosure.
Figure 8:
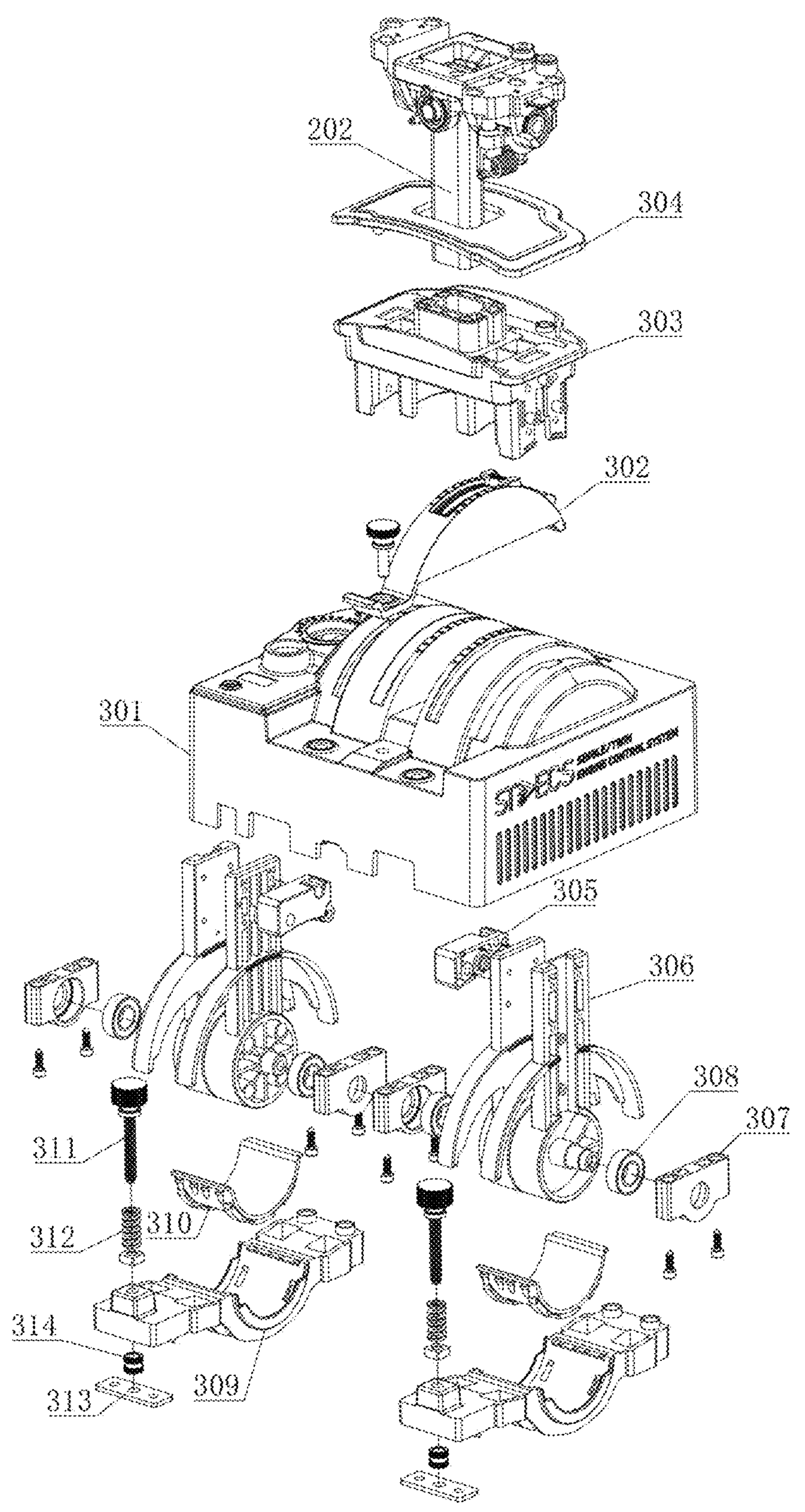
FIG. 8 is a schematic diagram of an exploded structure of a throttle base according to the present disclosure.

Referring to FIG. 1 to FIG. 8, an embodiment of the present disclosure provides a game joystick, including a control grip 1, a gimbal 2, and a throttle base 3. A throttle assembly is arranged in the throttle base 3; an upper end of the gimbal 2 is connected to the control grip 1; a lower end of the gimbal 2 is connected to the throttle assembly; the control grip 1 is pushed with a hand forwards, backwards, leftwards, or rightwards, so that the control grip 1 tilts forwards, backwards, leftwards, and rightwards relative to the throttle base 3, and a spacecraft in a game moves upwards, downwards, leftwards, or rightwards; after the pressure on the control grip 1 is relieved, the control grip 1 can achieve automatic returning and resetting; the control grip 1 is overall pushed forwards or pulled backwards with an arm; and the control grip 1 drives the throttle assembly to achieve throttling up or throttling down, thereby achieving a throttle-up or throttle-down operation on the spacecraft in the game.

In this embodiment, the control grip 1 includes an upper grip shell 101; a circuit board 103 is mounted on the upper grip shell 101; a lower grip shell 102 configured to protect the circuit board 103 is mounted at a bottom of the upper grip shell 101; a side panel 1031 is arranged between the upper grip shell 101 and the lower grip shell 102; a plurality of different types of controls are installed on the side panel 1031; and the controls include a button, a 5-way hat switch, an encoder wheel, and a thumbwheel wheel. A user can customize the functions of the controls according to a need.

Specifically, in this embodiment, the gimbal 2 includes a universal joint and a grip connecting rod 202; the universal joint includes a universal joint main body 201; the universal joint main body 201 is mounted on the upper grip shell 101 through a front-back returning mechanism; and an upper end of the grip connecting rod 202 is mounted on the universal joint main body 201 through a left-right returning mechanism. When the grip connecting rod 202 is connected to the throttle base 3, the grip connecting rod 202 remains stationary. The universal joint main body 201 and the control grip 1 rotate leftwards or rightwards relative to the grip connecting rod 202. When the grip connecting rod 202 is connected to the throttle base 3, the universal joint main body 201 and the grip connecting rod 202 remain stationary, and the control grip 1 can rotate forwards or backwards relative to the universal joint main body 201.

The front-back returning mechanism includes a first trunnion seat 20111 and two first returning clamps 20114; the universal joint main body 201 is U-shaped; the first trunnion seat 20111 is fixedly mounted on the upper grip shell 101; a first damping shaft 2011 is formed on one side of the universal joint main body 201; the first damping shaft 2011 is rotatably mounted on the first trunnion seat 20111 through a first bearing 20117; a first damping clip 20113 configured to adjust the damping during the rotation of the universal joint main body 201 is mounted on the first trunnion seat 20111; one end of the first damping clip 20113 is fixedly mounted at one end of the first trunnion seat 20111, and a trunnion seat sleeve is formed at the other end of the first trunnion seat 20111; a first insert nut is arranged in the other end of the first damping clip 20113; a first spring 20116 is arranged in the trunnion seat sleeve; a first damping adjustment screw 20118 is in threaded connection with the first insert nut after passing through the trunnion seat sleeve; a lower end of the first spring 20116 presses a top of the first damping clip 20113; a top of the first spring 20116 resists against an upper end inside the trunnion seat sleeve; a first flexible damping liner 20112 is arranged at an upper part of the first damping clip 20113; the first flexible damping liner 20112 is pressed on a surface of the first damping shaft 2011 by the first damping clip 20113;

the two first returning clamps 20114 are arranged in a mirror image manner; first clamping blocks are arranged at tops of the two first returning clamps 20114; a first stop block 201111 is formed on the first trunnion seat 20111; the two first returning clamps 20114 rotatably sleeve the first damping shaft 2011; the first clamping block at the top of one of the first returning clamps 20114 resists against one side of the first stop block 201111, and the first clamping block at the top of the other first returning clamp 20114 resists against the other side of the first stop block 201111; tail ends of the two first returning clamps 20114 are connected through a first tension spring 20115; a first pull block 2012 is formed at a lower end of one side of the universal joint main body 201 close to the first damping shaft 2011; and the first pull block 2012 is arranged between the tail ends of the two first returning clamps 20114.

The left-right returning mechanism includes a second trunnion seat 20211 and a second returning clamp 20214; the second trunnion seat 20211 is fixedly mounted on the universal joint main body 201; a second damping shaft 2021 is formed at an upper end of one side of the grip connecting rod 202; a through hole is provided at a bottom of the universal joint main body 201; a second stop block 2014 is arranged on an inner wall of the through hole; the first damping shaft 2011 is perpendicular to the second damping shaft 2021; the second damping shaft 2021 is rotatably mounted on the second trunnion seat 20211 through a second bearing 20217; the universal joint main body 201 is provided with a second damping clip 20213 configured to adjust the damping during the rotation of the grip connecting rod 202; one end of the second damping clip 20213 is fixedly mounted at one end of the universal joint main body 201; a mounting sleeve 2015 is formed at the other end of the universal joint main body 201; a second insert nut is arranged inside the other end of the first damping clip 20113; a second spring 20216 is arranged in the mounting sleeve 2015; a second damping adjustment screw 20218 is in threaded connection with the second insert nut after passing through the mounting sleeve 2015; a lower end of the second spring 20216 presses a top of the second damping clip 20213; a top of the second spring 20216 resists against an upper end inside the mounting sleeve 2015; a second flexible damping liner 20212 is arranged at an upper part of the second damping clip 20213; the second flexible damping liner 20212 is pressed on a surface of the second damping shaft 2021 by the second damping clip 20213;

the two second returning clamps 20214 are arranged in a mirror image manner; second clamping blocks are arranged at tops of the two second returning clamps 20214; the two second returning clamps 20214 rotatably sleeve the second damping shaft 2021; the second clamping block at the top of one of the second returning clamps 20214 resists against one side of the second stop block 2014, and the second clamping block at the top of the other second returning clamp 20214 resists against the other side of the second stop block 2014; tail ends of the two second returning clamps 20214 are connected through a second tension spring 20215; a second pull block 2022 is formed at an upper end of the grip connecting rod 202 close to the second damping shaft 20211; and the second pull block 2022 is arranged between the tail ends of the two second returning clamps 20214.

By the use of the above technical solutions, during use, when the spacecraft needs to rotate leftwards or rightwards, a user puts the hands on the control grip 1 and then tilts the control grip 1 to the left or the right. The first trunnion seat 20111 is fixed on the upper grip shell 101, and the universal joint main body 201 is rotatably connected to the first trunnion seat 20111 in a front-back direction, so that the control grip 1 that is rotated leftwards or rightwards may drive the universal joint main body 201 to rotate leftwards or rightwards relative to the grip connecting rod 202 through the first trunnion seat 20111. Furthermore, the second clamping blocks resisting against the second stop block 2014 are arranged at the tops of the second returning clamps 20214, so that when the control grip is pushed to the left, the second returning clamp 20214 on the left may be pulled by the second stop block 2014 to rotate leftwards. At this time, the second tension spring 20215 is stretched. However, the tail end of the second returning clamp 20214 on the right resists against the second pull block 2022, so that the second returning clamp on the right will not be pulled to the left by the second tension spring 20215. After the control grip 1 is released, the second returning clamp 20214 on the left will be pulled back and reset by the second tension spring 20215, thereby achieving a returning and resetting operation on the control grip 1. The working principle when the control grip 1 is pushed to the right is the same as the working principle when the control grip 1 is pushed to the left.

When the grip needs to rotate forwards or backwards, the user puts the hand on the control grip 1 and then pushes the control grip 1 to the front or the back. The first trunnion seat 20111 is fixed on the upper grip shell 101, the universal joint main body 201 is rotatably connected to the first trunnion seat 20111 in the front-back direction, and the grip connecting rod 202 is rotatably connected to the universal joint main body 201 in a left-right direction, so that when the control grip 1 is rotated forwards or backwards, the control grip 1 may rotate forwards or backwards relative to the universal joint main body 201. Furthermore, the first clamping blocks resisting against the first stop block 201111 are arranged at the tops of the first returning clamps 20114, so that when the control grip is pushed to the front, the first returning clamp 20114 on the front may be pulled by the first pull block 2012 to rotate forwards. At this time, the first tension spring 20115 is stretched. However, the first clamping block at the upper end of the first returning clamp 20114 on the back resists against the first stop block 201111, and will not be pulled forwards by the first tension spring 20115. After the control grip 1 is released, the first returning clamp 20114 on the front will be pulled back and reset by the first tension spring 20115, thereby achieving a returning and resetting operation on the control grip 1. The working principle when the control grip 1 is pushed to the back is the same as the working principle when the control grip 1 is pushed to the front.

During use, the damping during the rotation of the control grip 1 can be adjusted by tightening and untightening the first damping adjustment screw 20118 and the second damping adjustment screw 20218.

To transmit signals of forward, backward, leftward, and rightward rotations of the control grip 1 to the circuit board 103, a front-back sensing shaft 2013 is formed on the other side of the universal joint main body 201 away from the first damping shaft 2011; a first magnet mounting hole is formed in an end portion of the front-back sensing shaft 2013; a first magnet 20131 is fixedly connected into the first magnet mounting hole; the upper grip shell 101 is fixedly connected with a front-back trunnion seat 20133; the front-back sensing shaft 2013 is rotatably mounted on the front-back trunnion seat 20133 through a front-back bearing 20132; a first magnetic induction chip 20134 is mounted on the front-back trunnion seat 20133; the first magnetic induction chip 20134 is configured to detect a change value of a magnetic field caused by rotation of the first magnet 20131; and the first magnetic induction chip 20134 is electrically connected to the circuit board 103. A left-right sensing shaft 2023 is formed on the other side of the grip connecting rod 202 away from the second damping shaft 2021; a second magnet mounting hole is formed in an end portion of the left-right sensing shaft 2023; a second magnet 20231 is fixedly connected into the second magnet mounting hole; the universal joint main body 201 is fixedly connected with a left-right trunnion seat 20233; the left-right sensing shaft 2023 is rotatably mounted on the left-right trunnion seat 20233 through a left-right bearing 20232; a second magnetic induction chip 20234 is mounted on the left-right trunnion seat 20233; the second magnetic induction chip 20234 is configured to detect a change value of a magnetic field caused by rotation of the second magnet 20231; and the second magnetic induction chip 20234 is electrically connected to the circuit board 103.

Six holes are provided on the front-back trunnion seat 20133 and the first trunnion seat 20111. The six holes are configured fix the gimbal 2 on the upper grip shell 101.

In this embodiment, the throttle base 3 includes a base housing 301 and a bottom plate 3011; the base housing 301 is fixedly mounted on the bottom plate 3011; the throttle mechanism includes two throttle connecting rods 306 and a grip adapter 303; two sides of lower ends of the two throttle connecting rods 306 are rotatably mounted with throttle trunnion seats 307 through throttle bearings 308; the throttle trunnion seats 307 are fixedly mounted on the base housing 301; a quick-release detent frame 302 is fixedly mounted at a top of the base housing 301 through a bolt; upper ends of the two throttle connecting rods 306 are clamped to a lower end of the grip adapter 303 after sliding through the top of the base housing 301; a lower end of the grip connecting rod 202 is fixedly connected to the grip adapter 303; a top of the grip adapter 303 is clamped with a cover plate 304; a detent roller 305 is fixedly connected between the two throttle connecting rods 306; and the detent roller 305 is in contact with a top of the quick-release detent frame 302. According to this setting, if throttling up or throttling down is needed, the control grip 1 is pushed forwards or backwards with the arm. At this time, the control grip 1 and the gimbal 2 will form a whole to drive the throttle connecting rods 306 to rotate forwards or backwards, thereby achieving a throttle-up or throttle-down operation. In this embodiment, to transmit a throttle-up signal to the circuit board 103, third magnets are mounted on rotating shafts of the throttle connecting rods 306. A third magnetic induction chip configured to detect a change value of a magnetic field caused by the rotation of the third magnet is fixedly mounted on one side of each throttle trunnion seat 307. The third magnetic induction chip is electrically connected to the circuit board 103.

To facilitate the adjustment of the damping during the rotation of the throttle connecting rods 306, a damping adjustment member is arranged in the base housing 301; the damping adjustment member includes a throttle damping clip 309; one end of the throttle damping clip 309 is fixedly connected to an inner top of the base housing 301, and the other end of the throttle damping clip 309 is provided with a third insert nut 314 at an inner bottom; a lower end of a hand screw 311 is in threaded connection with the third insert nut 314 after penetrating through the top of the base housing 301; a third spring 312 sleeves the hand screw 311; a top of the third spring 312 resists against the inner top of the base housing 301; a bottom of the third spring 312 resists against a top of the throttle damping clip 309; a flexible throttle damping liner 310 is arranged on an inner side of the throttle damping clip 309; the flexible throttle damping liner 310 is pressed at bottoms of the throttle connecting rods 306 by the throttle damping clip 309; and a screw limiting sheet 313 configured to limit the third insert nut 314 is fixedly connected to a bottom of the throttle damping clip 309. The damping during the rotation of the throttle connecting rods 306 can be quickly adjusted by tightening and untightening the hand screw 311. To avoid the slip of the hand when the user holds the control grip 1, the top of the upper grip shell 101 is fixedly bonded with a first antislip pad 1021 and a second antislip pad 1022. A groove 1024 is formed on a top of the upper grip shell 101; an adjustment hole 1026 is formed inside the groove 1024; and a fixing hole 1025 configured to fix an adjustment hole cover 1023 in the groove 1024 is formed in the groove 1024. By the arrangement of the adjustment hole 1026, the adjustment hole cover 1023 is opened when the damping during the rotation of the control grip 1 needs to be adjusted, and a screwdriver passes through the adjustment hole 1026 to directly adjust the tightness of the first damping adjustment screw 20118 and the second damping adjustment screw 20218.

The above shows and describes several preferred embodiments of the present disclosure, but as mentioned earlier, it should be understood that the present disclosure is not limited to the form disclosed herein and should not be regarded as an exclusion of other embodiments. It can be used in various other combinations, modifications, and environments, and can be changed within the scope of the concept of the present disclosure concept through the above teachings or technologies or knowledge in the related art. All modifications and changes made by a person skilled in the art without departing from the spirit and scope of the present disclosure shall fall within the scope of protection of the claims of the present disclosure.

What is claimed is:

1. A game joystick, comprising a control grip (1), a gimbal (2), and a throttle base (3), wherein a throttle assembly is arranged in the throttle base (3); an upper end of the gimbal (2) is connected to the control grip (1); a lower end of the gimbal (2) is connected to the throttle assembly; the control grip (1) is pushed with a hand forwards, backwards, leftwards, or rightwards, so that the control grip (1) tilts forwards, backwards, leftwards, and rightwards relative to the throttle base (3), and a spacecraft in a game moves upwards, downwards, leftwards, or rightwards; after the pressure on the control grip (1) is relieved, the control grip (1) is able to achieve automatic returning and resetting; the control grip (1) is overall pushed forwards or pulled backwards with an arm; and the control grip (1) drives the throttle assembly to achieve throttling up or throttling down, thereby achieving a throttle-up or throttle-down operation on the spacecraft in the game.

2. The game joystick according to claim 1, wherein the control grip (1) comprises an upper grip shell (101); a circuit board (103) is mounted on the upper grip shell (101); and a lower grip shell (102) configured to protect the circuit board (103) is mounted at a bottom of the upper grip shell (101).

3. The game joystick according to claim 2, wherein the gimbal (2) comprises a universal joint and a grip connecting rod (202); the universal joint comprises a universal joint main body (201); the universal joint main body (201) is mounted on the upper grip shell (101) through a front-back returning mechanism; an upper end of the grip connecting rod (202) is mounted on the universal joint main body (201) through a left-right returning mechanism; when the grip connecting rod (202) is connected to the throttle base (3), the grip connecting rod (202) remains stationary; the universal joint main body (201) and the control grip (1) rotate leftwards or rightwards relative to the grip connecting rod (202); when the grip connecting rod (202) is connected to the throttle base (3), the universal joint main body (201) and the grip connecting rod (202) remain stationary, and the control grip (1) rotates forwards or backwards relative to the universal joint main body (201); a side panel (1031) is mounted between the upper grip shell (101) and the lower grip shell (102); a plurality of different types of controls are installed on the side panel (1031); and the controls comprise a button, a 5-way hat switch, an encoder wheel, and a thumbwheel wheel.

4. The game joystick according to claim 3, wherein the front-back returning mechanism comprises a first trunnion seat (20111) and two first returning clamps (20114); the universal joint main body (201) is U-shaped; the first trunnion seat (20111) is fixedly mounted on the upper grip shell (101); a first damping shaft (2011) is formed on one side of the universal joint main body (201); the first damping shaft (2011) is rotatably mounted on the first trunnion seat (20111) through a first bearing (20117); a first damping clip (20113) configured to adjust the damping during the rotation of the universal joint main body (201) is mounted on the first trunnion seat (20111); one end of the first damping clip (20113) is fixedly mounted at one end of the first trunnion seat (20111), and a trunnion seat sleeve is formed at the other end of the first trunnion seat (20111); a first insert nut is arranged in the other end of the first damping clip (20113); a first spring (20116) is arranged in the trunnion seat sleeve; a first damping adjustment screw (20118) is in threaded connection with the first insert nut after passing through the trunnion seat sleeve; a lower end of the first spring (20116) presses a top of the first damping clip (20113); a top of the first spring (20116) resists against an upper end inside the trunnion seat sleeve; a first flexible damping liner (20112) is arranged at an upper part of the first damping clip (20113); the first flexible damping liner (20112) is pressed on a surface of the first damping shaft (2011) by the first damping clip (20113);

the two first returning clamps (20114) are arranged in a mirror image manner; first clamping blocks are arranged at tops of the two first returning clamps (20114); a first stop block (201111) is formed on the first trunnion seat (20111); the two first returning clamps (20114) rotatably sleeve the first damping shaft (2011); the first clamping block at the top of one of the first returning clamps (20114) resists against one side of the first stop block (201111), and the first clamping block at the top of the other first returning clamp (20114) resists against the other side of the first stop block (201111); tail ends of the two first returning clamps (20114) are connected through a first tension spring (20115); a first pull block (2012) is formed at a lower end of one side of the universal joint main body (201) close to the first damping shaft (2011); and the first pull block (2012) is arranged between the tail ends of the two first returning clamps (20114).

5. The game joystick according to claim 4, wherein a front-back sensing shaft (2013) is formed on the other side of the universal joint main body (201) away from the first damping shaft (2011); a first magnet mounting hole is formed in an end portion of the front-back sensing shaft (2013); a first magnet (20131) is fixedly connected into the first magnet mounting hole; the upper grip shell (101) is fixedly connected with a front-back trunnion seat (20133); the front-back sensing shaft (2013) is rotatably mounted on the front-back trunnion seat (20133) through a front-back bearing (20132); a first magnetic induction chip (20134) is mounted on the front-back trunnion seat (20133); the first magnetic induction chip (20134) is configured to detect a change value of a magnetic field caused by rotation of the first magnet (20131); and the first magnetic induction chip (20134) is electrically connected to the circuit board (103).

6. The game joystick according to claim 5, wherein the left-right returning mechanism comprises a second trunnion seat (20211) and a second returning clamp (20214); the second trunnion seat (20211) is fixedly mounted on the universal joint main body (201); a second damping shaft (2021) is formed at an upper end of one side of the grip connecting rod (202); a through hole is provided at a bottom of the universal joint main body (201); a second stop block (2014) is arranged on an inner wall of the through hole; the first damping shaft (2011) is perpendicular to the second damping shaft (2021); the second damping shaft (2021) is rotatably mounted on the second trunnion seat (20211) through a second bearing (20217); the universal joint main body (201) is provided with a second damping clip (20213) configured to adjust the damping during the rotation of the grip connecting rod (202); one end of the second damping clip (20213) is fixedly mounted at one end of the universal joint main body (201); a mounting sleeve (2015) is formed at the other end of the universal joint main body (201); a second insert nut is arranged inside the other end of the first damping clip (20113); a second spring (20216) is arranged in the mounting sleeve (2015); a second damping adjustment screw (20218) is in threaded connection with the second insert nut after passing through the mounting sleeve (2015); a lower end of the second spring (20216) presses a top of the second damping clip (20213); a top of the second spring (20216) resists against an upper end inside the mounting sleeve (2015); a second flexible damping liner (20212) is arranged at an upper part of the second damping clip (20213); the second flexible damping liner (20212) is pressed on a surface of the second damping shaft (2021) by the second damping clip (20213);

the two second returning clamps (20214) are arranged in a mirror image manner; second clamping blocks are arranged at tops of the two second returning clamps (20214); the two second returning clamps (20214) rotatably sleeve the second damping shaft (2021); the second clamping block at the top of one of the second returning clamps (20214) resists against one side of the second stop block (2014), and the second clamping block at the top of the other second returning clamp (20214) resists against the other side of the second stop block (2014); tail ends of the two second returning clamps (20214) are connected through a second tension spring (20215); a second pull block (2022) is formed at an upper end of the grip connecting rod (202) close to the second damping shaft (20211); and the second pull block (2022) is arranged between the tail ends of the two second returning clamps (20214).

7. The game joystick according to claim 6, wherein a left-right sensing shaft (2023) is formed on the other side of the grip connecting rod (202) away from the second damping shaft (2021); a second magnet mounting hole is formed in an end portion of the left-right sensing shaft (2023); a second magnet (20231) is fixedly connected into the second magnet mounting hole; the universal joint main body (201) is fixedly connected with a left-right trunnion seat (20233); the left-right sensing shaft (2023) is rotatably mounted on the left-right trunnion seat (20233) through a left-right bearing (20232); a second magnetic induction chip (20234) is mounted on the left-right trunnion seat (20233); the second magnetic induction chip (20234) is configured to detect a change value of a magnetic field caused by rotation of the second magnet (20231); and the second magnetic induction chip (20234) is electrically connected to the circuit board (103).

8. The game joystick according to claim 7, wherein the throttle base (3) comprises a base housing (301) and a bottom plate (3011); the base housing (301) is fixedly mounted on the bottom plate (3011); the throttle mechanism comprises two throttle connecting rods (306) and a grip adapter (303); two sides of lower ends of the two throttle connecting rods (306) are rotatably provided with throttle trunnion seats (307) through throttle bearings (308); the throttle trunnion seats (307) are fixedly mounted on the base housing (301); a quick-release detent frame (302) is fixedly mounted at a top of the base housing (301) through a bolt; upper ends of the two throttle connecting rods (306) are clamped to a lower end of the grip adapter (303) after sliding through the top of the base housing (301); a lower end of the grip connecting rod (202) is fixedly connected to the grip adapter (303); a top of the grip adapter (303) is clamped with a cover plate (304); a detent roller (305) is fixedly connected between the two throttle connecting rods (306); and the detent roller (305) is in contact with a top of the quick-release detent frame (302).

9. The game joystick according to claim 8, wherein a damping adjustment member is arranged in the base housing (301); the damping adjustment member comprises a throttle damping clip (309); one end of the throttle damping clip (309) is fixedly connected to an inner top of the base housing (301), and the other end of the throttle damping clip (309) is provided with a third insert nut (314) at an inner bottom; a lower end of a hand screw (311) is in threaded connection with the third insert nut (314) after penetrating through the top of the base housing (301); a third spring (312) sleeves the hand screw (311); a top of the third spring (312) resists against the inner top of the base housing (301); a bottom of the third spring (312) resists against a top of the throttle damping clip (309); a flexible throttle damping liner (310) is arranged on an inner side of the throttle damping clip (309); the flexible throttle damping liner (310) is pressed at bottoms of the throttle connecting rods (306) by the throttle damping clip (309); and a screw limiting sheet (313) configured to limit the third insert nut (314) is fixedly connected to a bottom of the throttle damping clip (309).

10. The game joystick according to claim 2, wherein a groove (1024) is formed on a top of the upper grip shell (101); an adjustment hole (1026) is formed inside the groove (1024); a fixing hole (1025) configured to fix an adjustment hole cover (1023) in the groove (1024) is formed in the groove (1024); and the top of the upper grip shell (101) is fixedly bonded with a first antislip pad (1021) and a second antislip pad (1022).

* * * * *